(12) United States Patent
Wu

(10) Patent No.: US 10,302,108 B2
(45) Date of Patent: May 28, 2019

(54) FIXING DEVICE

(71) Applicant: HANWIT PRECISION INDUSTRIES LTD., New Taipei (TW)

(72) Inventor: Ming-De Wu, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 98 days.

(21) Appl. No.: 15/478,848

(22) Filed: Apr. 4, 2017

(65) Prior Publication Data

US 2018/0058487 A1    Mar. 1, 2018

Related U.S. Application Data

(63) Continuation-in-part of application No. 15/264,930, filed on Sep. 14, 2016.

(30) Foreign Application Priority Data

Aug. 23, 2016 (TW) .............................. 105212819 U

(51) Int. Cl.
| | | |
|---|---|---|
| F16B 5/06 | (2006.01) | |
| F16B 2/12 | (2006.01) | |
| F16B 3/00 | (2006.01) | |
| F16B 5/02 | (2006.01) | |

(52) U.S. Cl.
CPC ............. *F16B 5/0642* (2013.01); *F16B 2/12* (2013.01); *F16B 5/0657* (2013.01); *F16B 3/00* (2013.01); *F16B 5/0266* (2013.01)

(58) Field of Classification Search
CPC ............................. F16B 5/0635; F16B 5/0642
See application file for complete search history.

(56) References Cited

U.S. PATENT DOCUMENTS

| | | | | |
|---|---|---|---|---|
| 2,053,864 A | * | 9/1936 | Cook | E05D 11/02 16/274 |
| 5,507,610 A | * | 4/1996 | Benedetti | F16B 5/0628 24/297 |
| 5,577,295 A | * | 11/1996 | Papke | E05D 5/128 16/254 |
| 6,178,599 B1 | * | 1/2001 | Worden | B62D 65/06 16/261 |
| 7,954,205 B2 | * | 6/2011 | Xueyong | B60R 13/0206 24/289 |
| 8,495,802 B2 | * | 7/2013 | Okada | B60R 13/0206 24/297 |
| 8,555,466 B1 | * | 10/2013 | Wang | B25G 3/18 16/422 |

(Continued)

*Primary Examiner* — Jason W San
(74) *Attorney, Agent, or Firm* — Muncy, Geissler, Olds & Lowe, P.C.

(57) ABSTRACT

The present disclosure illustrates a fixing device including a fixing assembly, a first plate and a second plate. The fixing assembly includes a sleeve, a position-limiting device, an elastic element, and a fastener. A supporting surface of the second plate is slid along a guiding incline of a stop part of the fastener, so that a stop section and the stop part of the fastener can be respectively positioned in a first fastening recess and a second fastening recess of the second plate. Later, the user just needs to push the position-limiting device to separate the fixing assembly from the second plate. Therefore, effects of reliable positioning and easy detachment can be achieved.

10 Claims, 10 Drawing Sheets

(56) References Cited

U.S. PATENT DOCUMENTS

| | | | |
|---|---|---|---|
| 2004/0016088 A1* | 1/2004 | Angellotti | F16B 5/065 24/297 |
| 2011/0070046 A1* | 3/2011 | Wang | F16B 5/0208 411/120 |
| 2011/0070049 A1* | 3/2011 | Wang | F16B 5/0208 411/372.6 |
| 2011/0081218 A1* | 4/2011 | Wang | F16B 5/0208 411/120 |
| 2011/0123291 A1* | 5/2011 | Chiu | F16B 5/0208 411/342 |
| 2012/0195711 A1* | 8/2012 | Chiu | F16B 5/0208 411/103 |
| 2012/0224935 A1* | 9/2012 | Chiu | F16B 5/0266 411/352 |
| 2012/0237315 A1* | 9/2012 | Chiu | F16B 5/0208 411/171 |
| 2012/0237316 A1* | 9/2012 | Chiu | F16B 5/0208 411/353 |
| 2012/0251265 A1* | 10/2012 | Chiu | F16B 5/0208 411/349 |
| 2013/0170895 A1* | 7/2013 | Tseng | F16B 35/06 403/270 |
| 2013/0294863 A1* | 11/2013 | Tseng | F16B 5/0208 411/175 |
| 2014/0068921 A1* | 3/2014 | Tseng | F16B 5/0208 29/525.02 |
| 2014/0105707 A1* | 4/2014 | Tseng | F16B 21/04 411/508 |
| 2016/0003271 A1* | 1/2016 | Wang | F16B 5/00 403/322.4 |
| 2017/0009793 A1* | 1/2017 | Mahoney | B21J 15/36 |
| 2017/0073904 A1* | 3/2017 | McDowell | E01C 11/02 |
| 2017/0074303 A1* | 3/2017 | Bowers | F16B 5/0642 |
| 2017/0074304 A1* | 3/2017 | Bowers | F16B 5/0642 |
| 2017/0240121 A1* | 8/2017 | Yon | B60R 13/0206 |

* cited by examiner

FIXING DEVICE

This application is a Continuation-In-Part of application Ser. No. 15/264,930, filed on Sep. 14, 2016, for which priority is claimed under 35 U.S.C. § 120, the entire contents of which are hereby incorporated by reference.

This application claims the priority benefit of Taiwan patent application number 105212819, filed on Aug. 23, 2016.

BACKGROUND OF THE INVENTION

1. Field of the Invention

The present disclosure relates to a fixing device, more particularly to a fixing device including a fixing assembly in which a supporting surface of a second plate is slid along a guiding incline of a stop part, so that a stop section and the stop part of the fastener can be respectively positioned in a first fastening recess and a second fastening recess of the second plate; later, the user just needs to push the position-limiting device to separate the fixing assembly from the second plate. Therefore, effects of reliable positioning and easy detachment can be achieved.

2. Description of the Related Art

With progress of electronic technology, many products use screws or bolts for positioning, for example, the products having movably extendable structures, such as drawers, keyboard stands, machine plate assembly and so on, may use screws or bolts to position sliding rails or chutes after the sliding rails or chutes are moved to particular locations, so that the user can perform wiring operation, move or transport equipment, such as telecommunications cabinet, computer server, working machine, or equipment formed by assembling a plurality of devices and mechanisms. In the way of positioning the sliding rail or chute during movement, the screws or bolts are used to make two stacked plates slide for positioning, to facilitate the staff member to perform operation.

Furthermore, a server chassis for a general computer or an industrial computer is usually used to contain electronic devices such as a motherboard, a power supplier, a hard disk and a fan. Different motherboard manufacturers usually develop different specifications for motherboards, so many copper pillars must be disposed on a bottom plate of the chassis, and after the motherboard is flatly placed on the copper pillars, screws are respectively inserted through holes of the motherboard to be locked into the copper pillars, whereby the motherboard can be integrally fixed with the chassis. Naturally, with growth of shipment of chassis of different manufacturers, a number of the copper pillars disposed on the bottom plate also increases in multiple times. For this reason, the conventional way of locking the screws into the copper pillars to fix the motherboard with the bottom plate, may be constrained by limited space inside the chassis, and spend more time and labor costs in operation, which is disadvantageous for quick assembly. To summarize, aforesaid fixing manner has problems in complicated assembly process, more time cost and inconvenient operation.

What is need is to develop a fixing device to solve aforementioned problems.

SUMMARY OF THE INVENTION

In order to solve aforementioned problems, inventor of the present disclosure develops a fixing device according to collected data, years of experience and multiple tests and modifications.

An objective of the present disclosure is to provide a fixing device, and when supporting surfaces of a second plate contact with a guiding incline of a stop part of the fixing device and the second plate is then pushed into a fixing assembly, a rod is moved out of a hole of the sleeve and, and at the same time, a bottom of a position-limiting device presses and resiliently deform the elastic element until the rod and the stop section pass through a channel and respectively enter a first fastening recess and a second fastening recess, and after the rod and the stop section have entered the first fastening recess and the second fastening recess respectively, the elastic element is elastically recovered, and the position-limiting device and the fastener are back to original positions thereof, so that the stop section and the stop part of the fastener may be reliably positioned in the first fastening recess and the second fastening recess, respectively. In order to separate the second plate from a first plate, the user may just press a surface of the position-limiting device to move the rod out of the hole of the sleeve again, so that the stop section and the stop part are respectively free from being constrained by the first fastening recess and the second fastening recess, and at this time, the user can force to separate the second plate from the first plate. The fixing assembly of the present disclosure has a simple structure and can be positioned with the second plate by aligned insertion only, and the user can push the position-limiting device by finger to separate the second plate from the position-limiting device. As a result, effects of reliable positioning and easy detachment can be achieved.

Other objective of the present disclosure is that the two supporting surfaces of the second plate are arc-shaped, and each of the two supporting surfaces has a larger area for pushing the guiding incline of the stop part, so that the rod may be moved out of the hole of the sleeve more easily; furthermore, the arc-shaped supporting surfaces may also enhance structural strength of the second plate and improve lifetime of the second plate.

DETAILED DESCRIPTION OF THE PREFERRED EMBODIMENTS

Figure 1:
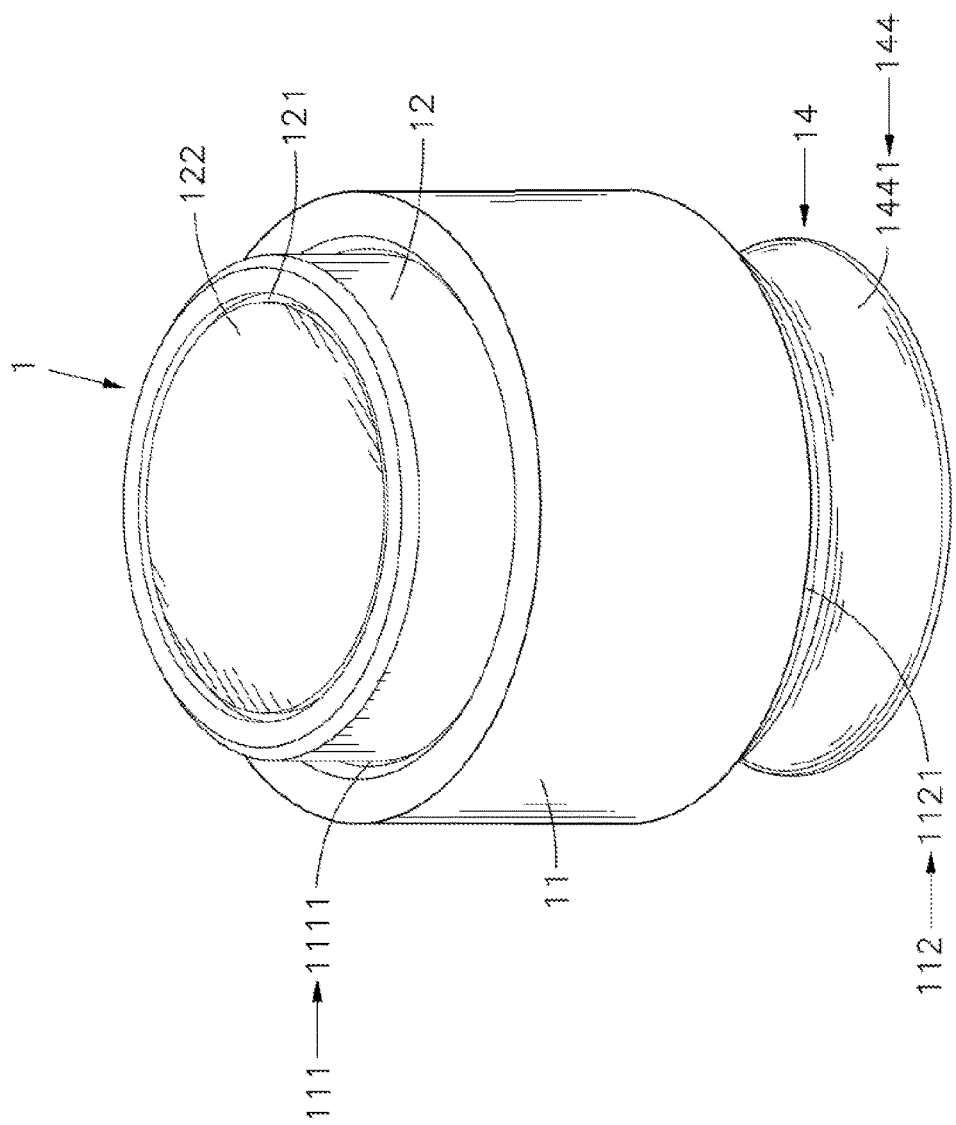
FIG. 1 is an elevational view of a fixing assembly of the present disclosure.
Figure 2:
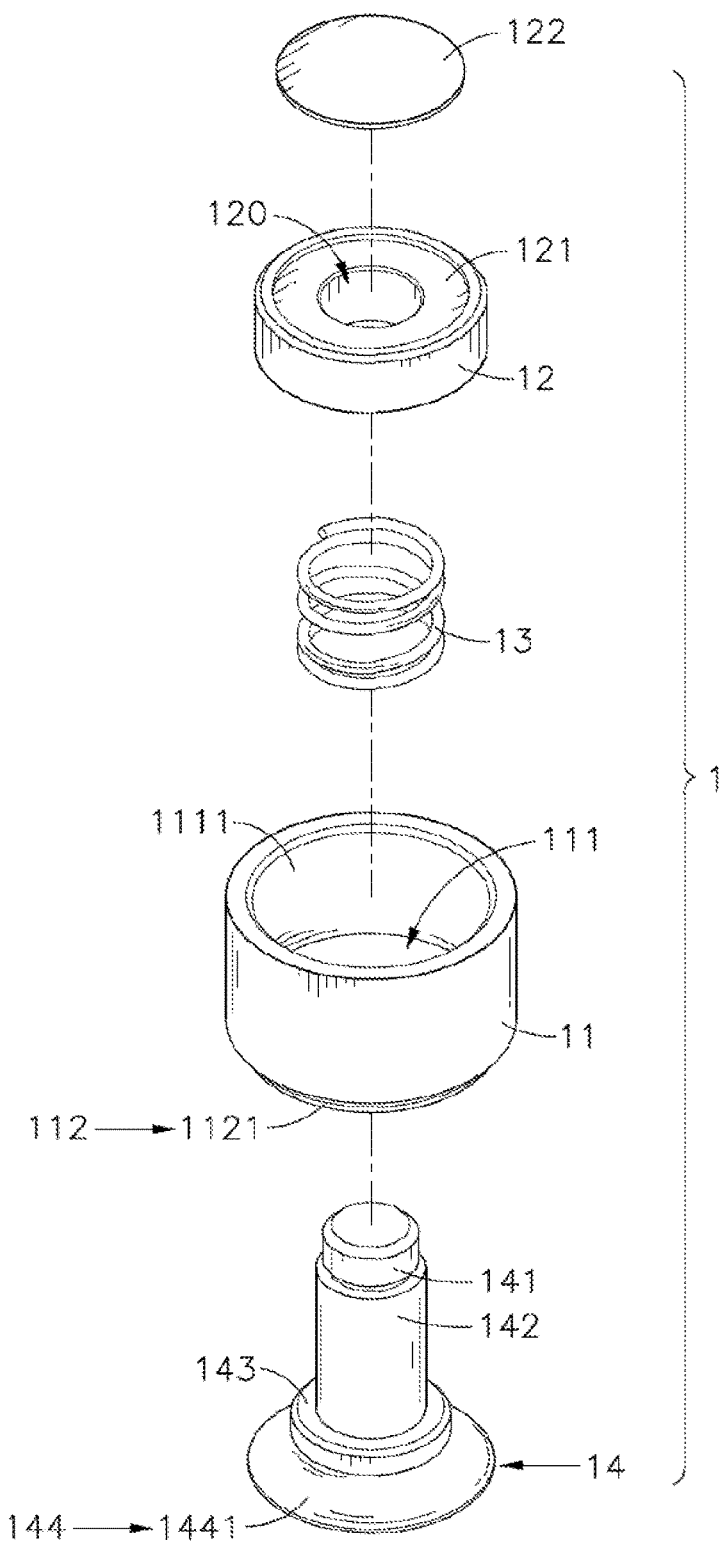
FIG. 2 is an exploded view of the fixing assembly of the present disclosure.
Figure 3:
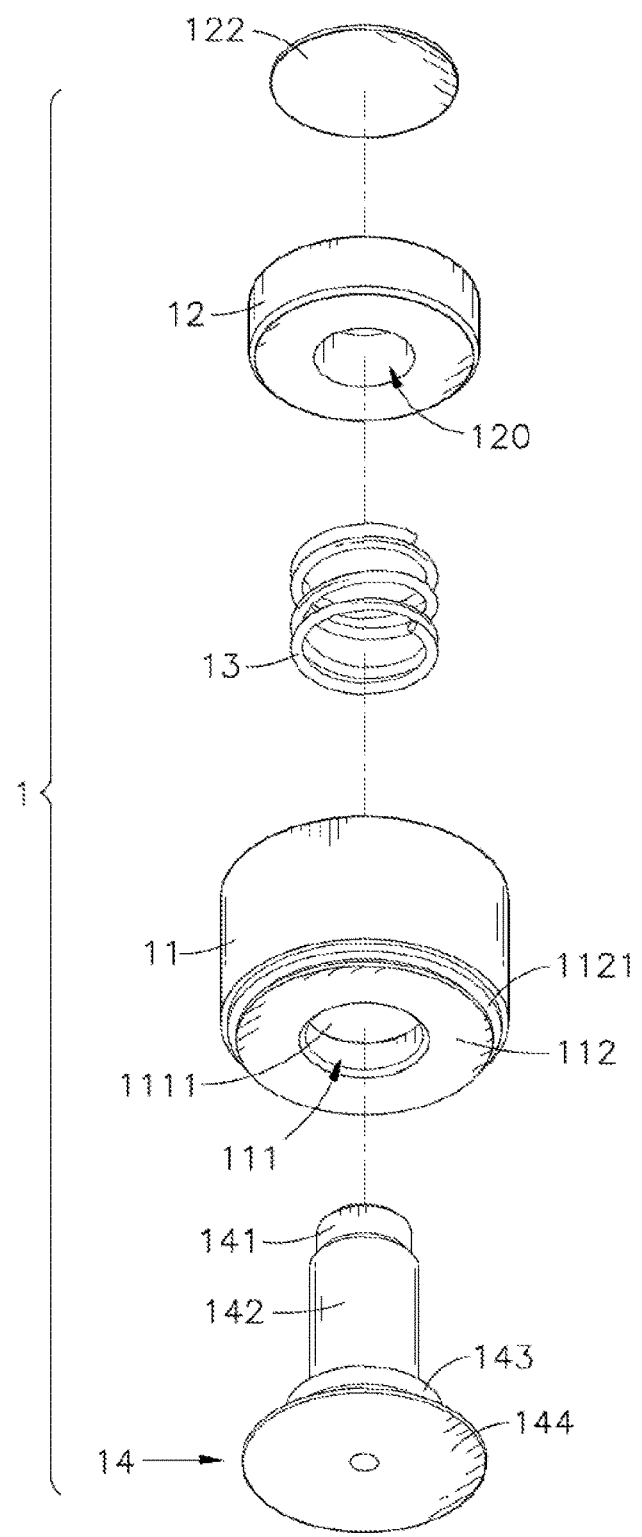
FIG. 3 is an exploded view of the fixing assembly of the present disclosure, when viewed from another angle.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Please refer to FIGS. 1-6, which are elevational view, exploded view, exploded view when viewed from another angle of the fixing assembly of the present disclosure, elevational views of the fixing assembly before assembly, and sectional view of a second plate before assembled with the fixing assembly. As shown in FIGS. 1-6, a fixing device of the present disclosure includes a fixing assembly 1, a first plate 2 and a second plate 3.

The fixing assembly 1 includes a sleeve 11, a position-limiting device 12, an elastic element 13 and a fastener 14. The sleeve 11 is formed with a hole 111 cut therethrough, and the hole has a receiving groove 1111 formed at a top thereof and having an extended diameter. The sleeve 11 includes a fastening part 112 formed at a bottom thereof, and the fastening part 112 is formed with an annular trench 1121 on an outer surface thereof. The position-limiting device 12 is disposed inside the sleeve 11 and includes an embedded hole 120 and a groove 121 which is recessed on a surface thereof and along a periphery of the embedded hole 120. A plate 122 is covered on the groove 121. The elastic element 13 is abutted between a bottom of the position-limiting device 12 and the receiving groove 1111 of the hole 111 of the sleeve 11. The fastener 14 is inserted through the hole 111 from the bottom of the sleeve 11 and fixed with the position-limiting device 12. The fastener 14 includes a butt joint part 141 embedded and fixed in the embedded hole 120, and a rod 142 extended from a lower portion of the butt joint part 141 and inserted through the hole 111 of the sleeve 11. The rod 142 includes a stop section 143 extended outwardly from a bottom thereof and out of the sleeve 11, and having a diameter larger than that of the hole 111. Furthermore, the stop section 143 includes a stop part 144 outwardly protruded from a bottom thereof and having an outer diameter gradually-extended. The stop part 144 includes a guiding incline 1441 formed obliquely at a top thereof.

The first plate 2 includes a hole 21 configured to fix the fastening part 112 of the sleeve 11.

While being assembled, the second plate 3 is placed in parallel to the first plate 2. The second plate 3 includes a flat base plate 31, a first fastening recess 311 cut through the base plate 31, and a sheet 32 in an inclined shape folded and extended from a side of the base plate 31. A height difference is formed between the sheet 32 and the base plate 31 for passing the stop section 143. The sheet 32 includes a second fastening recess 321 cut therethrough, located below and aligned with the first fastening recess 311, and having an outer diameter larger than that of the first fastening recess 311. A channel 33 is formed by cutting through a folded portion of the second plate 3 from outside to inside, and the channel 33 is in communication with the first fastening recess 311 and the second fastening recess 321. The channel 33 includes supporting protrusions 331 at an end portion thereof and respectively protruded from two inside walls of a side of the base plate 31. Supporting surfaces 34 are respectively formed at the folded portion of a side of the second plate 3 and at two outer sides of the channel 33, and configured to abut against the guiding incline 1441 of the stop part 144, to drive the rod 142 to move out of the hole 111 of the sleeve 11.

An interval of the channel 33 of the second plate 3 is larger than an outer diameter of the stop section 143, and smaller than the outer diameter of the stop part 144. A distance between the two supporting protrusions 331 of the channel 33 is larger than the outer diameter of the rod 142 and smaller than the outer diameter of the stop section 143.

Furthermore, the outer diameters of the rod 142 and the stop section 143 of the fastener 14 are smaller than that of the first fastening recess 311, and the outer diameter of the stop part 144 is larger than that of the first fastening recess 311 and smaller than that of the second fastening recess 321. Preferably, a contained angle between the guiding incline 1441 of the stop part 144 and a bottom surface of the stop part 144 is in a range of 60° to 120°, so that the second plate 3 may be easily inserted into the channel 33 for positioning.

Preferably, the sheet 32 of the second plate 3 may be tiled to form a height difference between the sheet 32 and the base plate 31 for passing the stop section 143; however, in actual application, only a folding height existing between the base plate 31 of the second plate 3 and the folded sheet 32 for passing the stop section 143 is enough, and the inclined angle is not necessary. It should be noted that any manner able to achieve aforementioned effect is covered by scope of the present disclosure set forth in the claims, and numerous modifications, variations and enhancements can be made thereto by those skilled in the art without departing from the spirit and scope of the present disclosure set forth in the claims.

In order to assemble the fixing assembly 1 with the first plate 2, the fastening part 112 of the sleeve 11 of the fixing assembly 1 is abutted with the periphery of the hole 21 of the first plate 2 by the bottom surface thereof, and a stamping fixture is then used to stamp the plate 122 of the position-limiting device 12 to elastically deform the elastic element 13 and, at this time, the fastening part 112 of the sleeve 11 can be downwardly riveted into the hole 21, and the sleeve 11 can be further stably locked in the hole 21 by the annular trench 1121 of the fastening part 112, so that the sleeve 11 can be integrally assembled with the first plate 2.

Preferably, the fastening part 112 of the sleeve 11 may be combined with the first plate 2 by a riveting manner; however, in actual application, the sleeve 11 may be fixed on the first plate 2 by surface mount technology (SMT), welding manner, mortise or other combining manner. It should be noted that any manner able to achieve aforementioned effect is covered by scope of the present disclosure set forth in the claims, and numerous modifications, variations and enhancements can be made thereto by those skilled in the art without departing from the spirit and scope of the present disclosure set forth in the claims.

Figure 4:
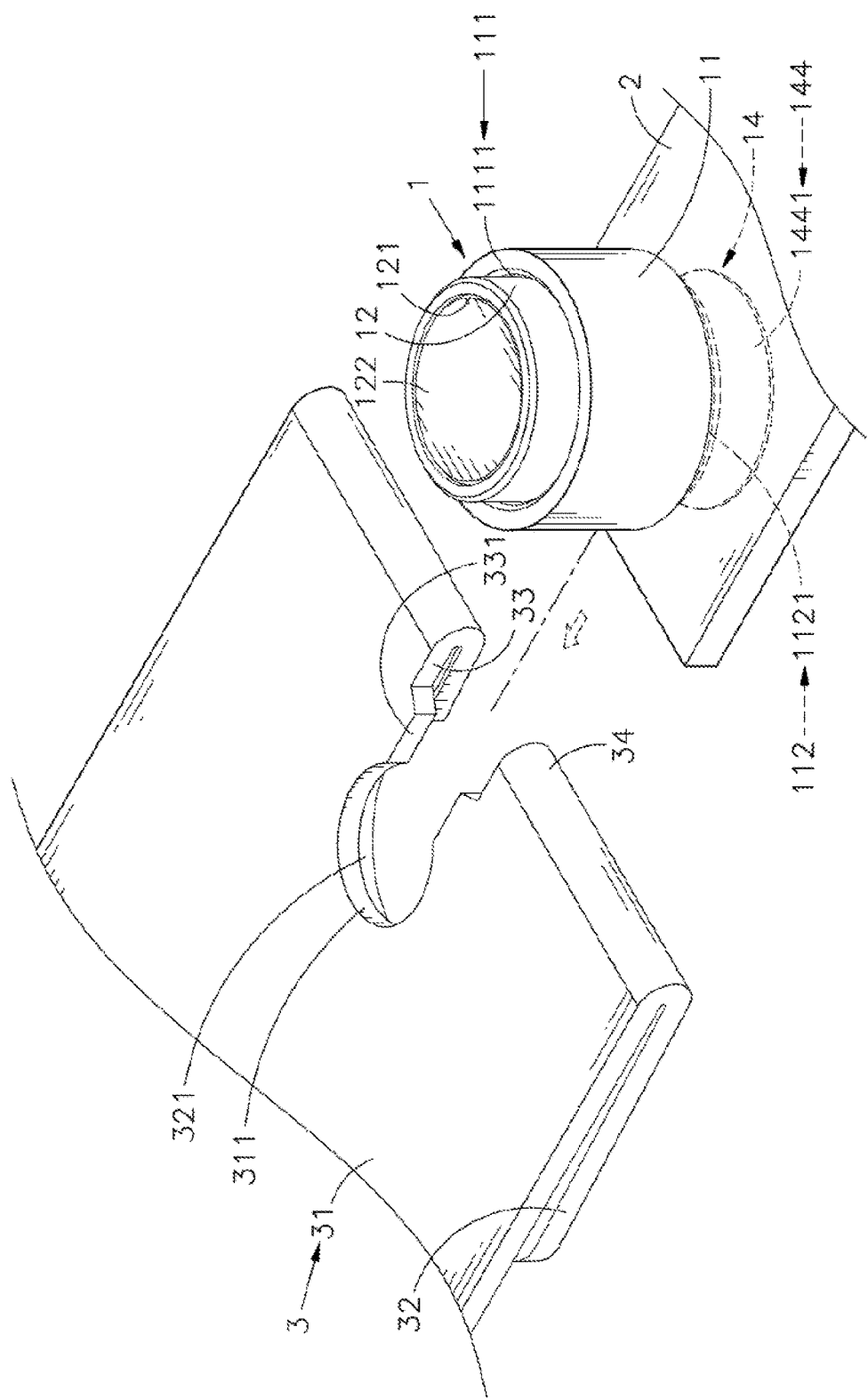
FIG. 4 is an elevational view of the fixing assembly and a base plate of the present disclosure, before assembly.
Figure 5:
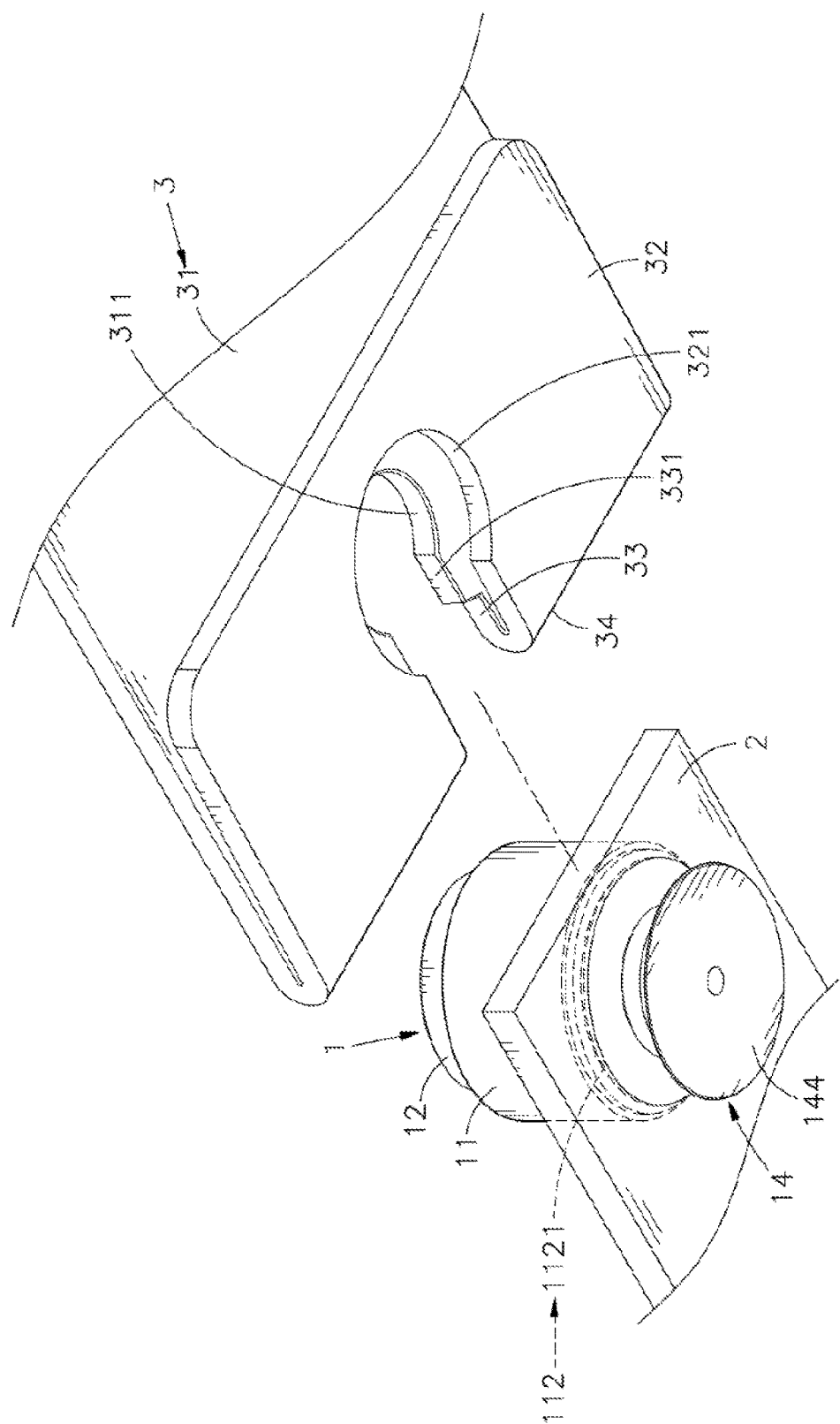
FIG. 5 is an elevational view of the fixing assembly and the base plate of the present disclosure before assembly, when viewed from another angle.
Figure 6:
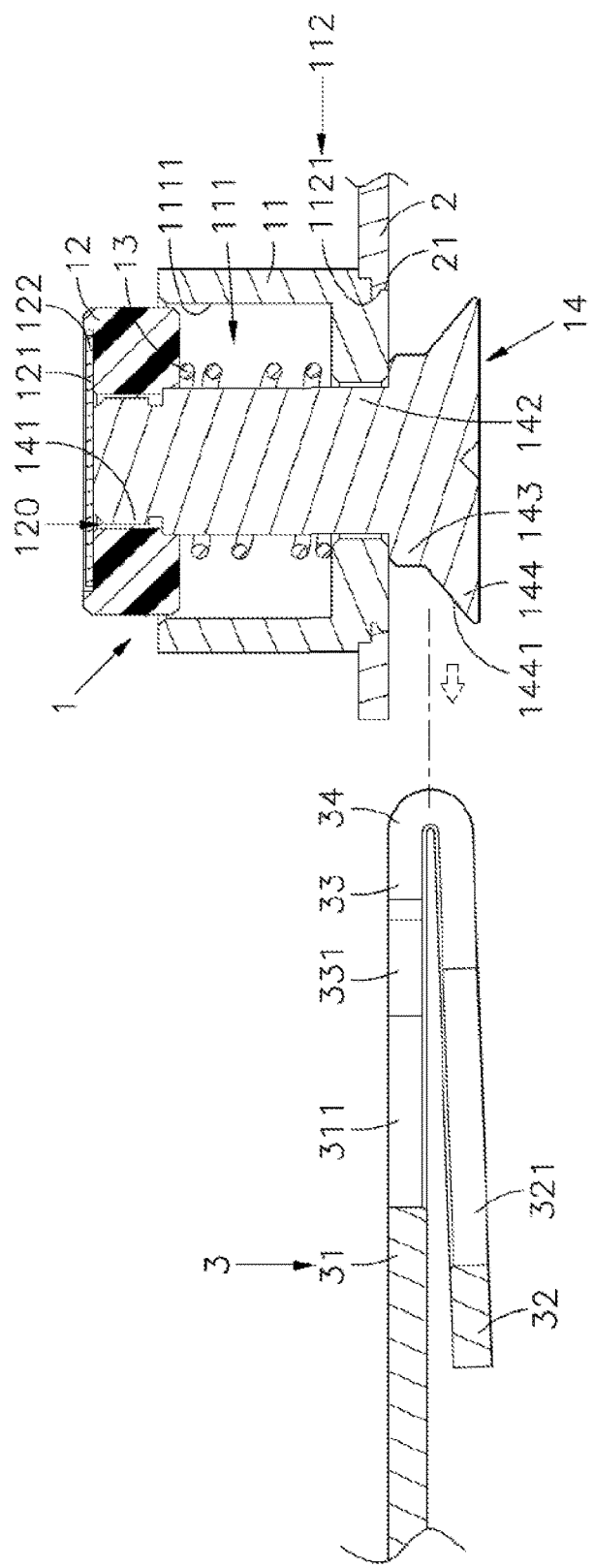
FIG. 6 is a sectional view of a second plate of the present disclosure, before assembled with the fixing assembly.
Figure 7:
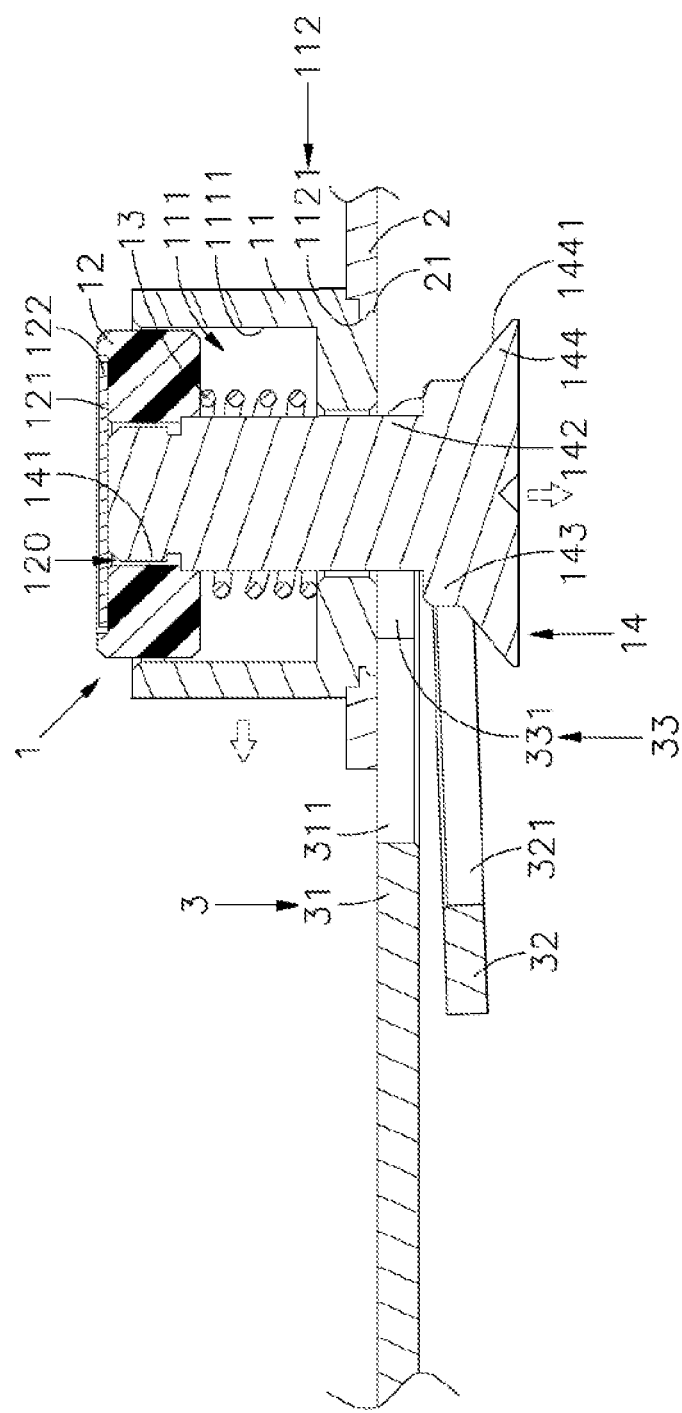
FIG. 7 is a sectional view of the second plate of the present disclosure, while being assembled with the fixing assembly.
Figure 8:
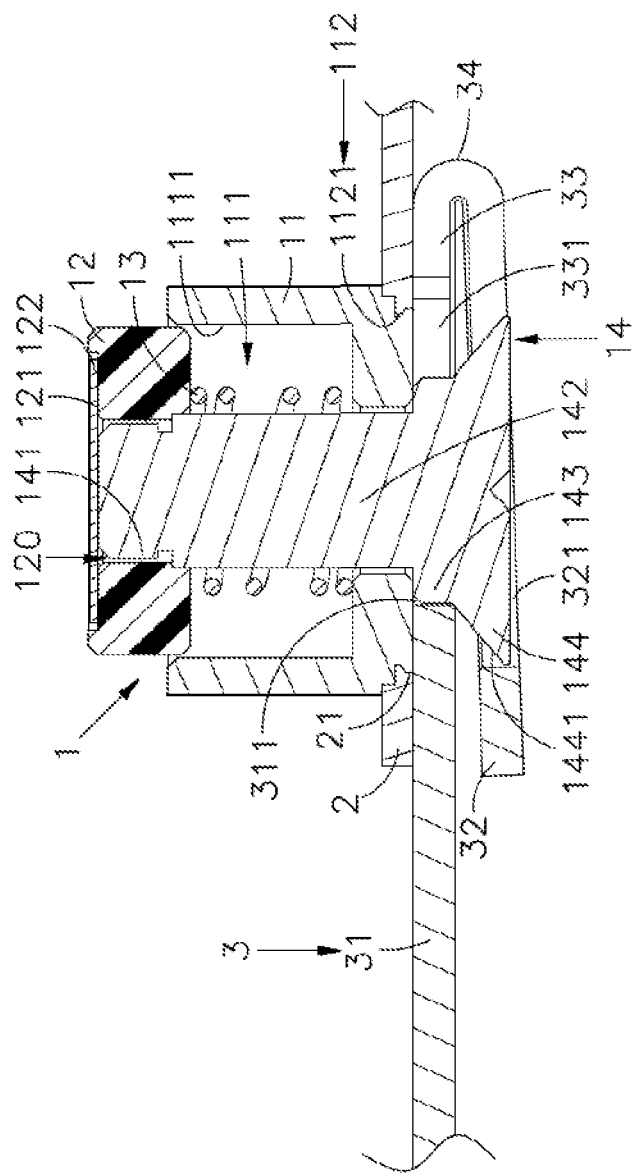
FIG. 8 is a sectional view of the second plate of the present disclosure, after assembled with the fixing assembly.
Figure 9:
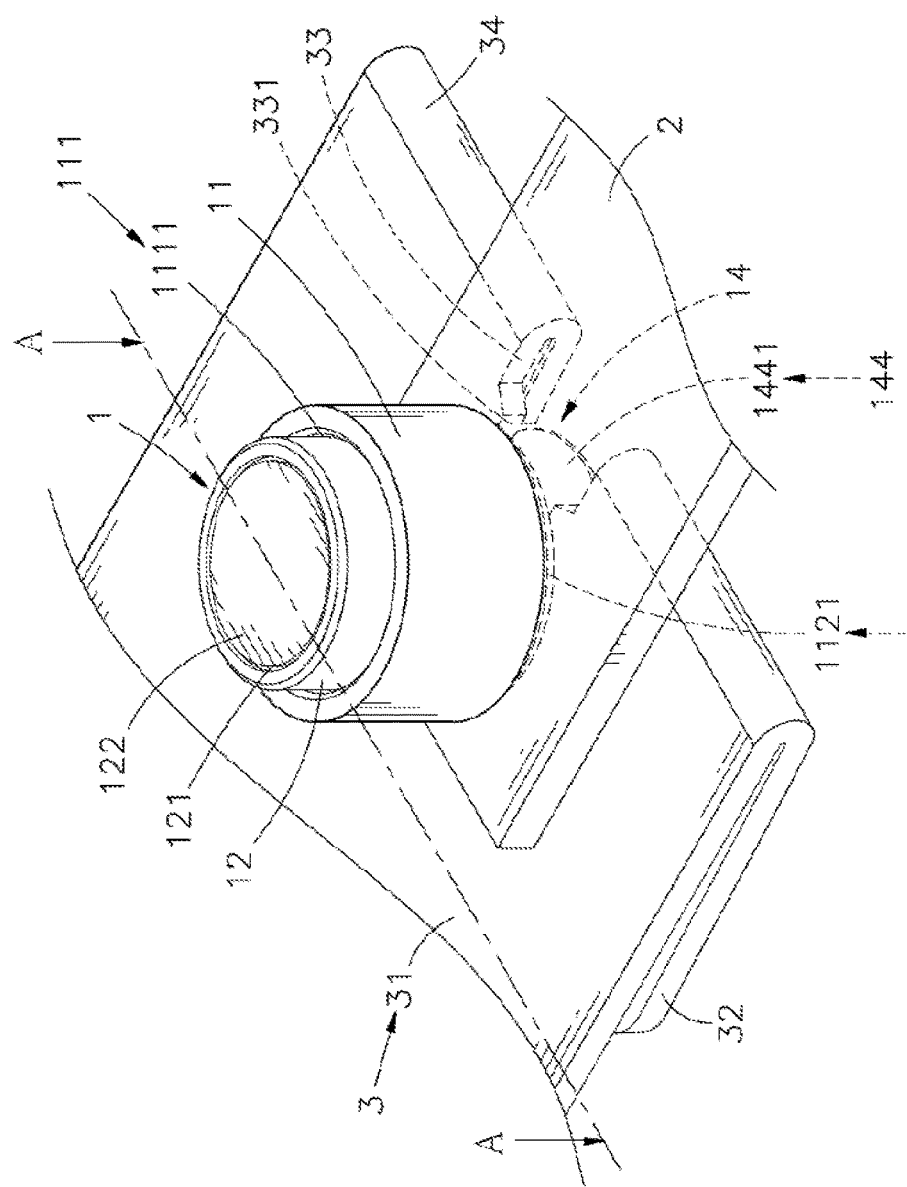
FIG. 9 is an elevational view of assembly of the fixing assembly, the first plate and the second plate of the present disclosure.
Figure 10:
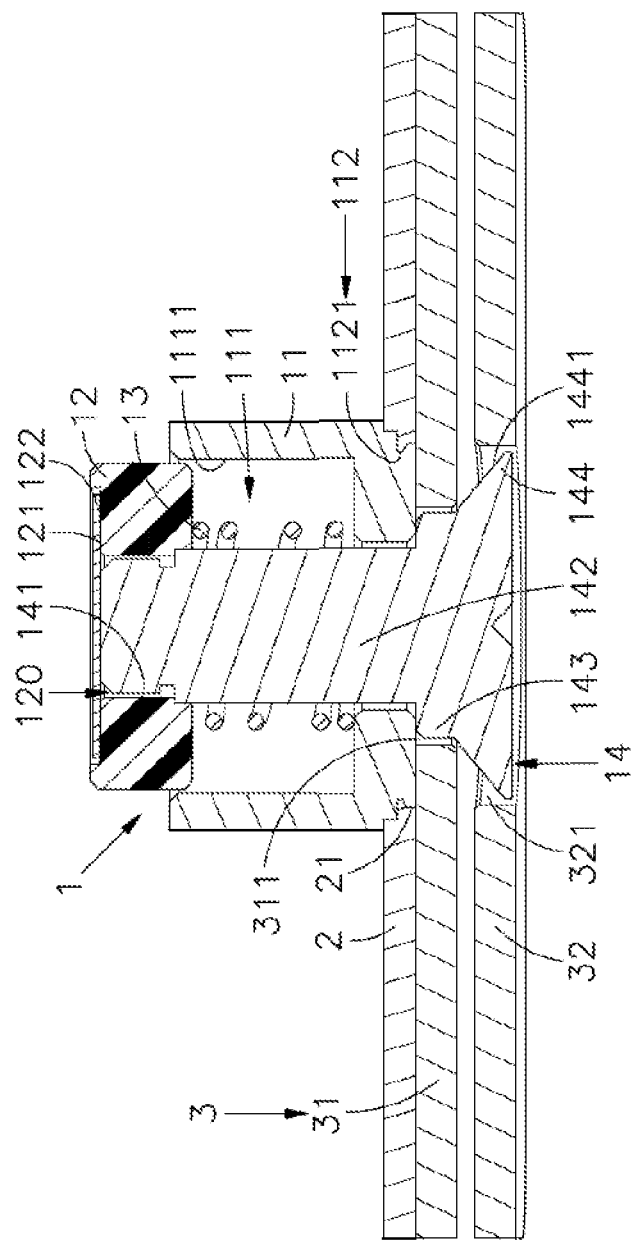
FIG. 10 is a sectional view taken along a line A of the FIG. 9.

Please refer to FIGS. 4-10. FIG. 4 is an elevational view of the fixing assembly and a base plate of the present disclosure, before assembly. FIG. 5 is an elevational view of the fixing assembly and a base plate of the present disclosure before assembly, when viewed from another angle. FIG. 6 is a sectional view of a second plate of the present disclosure, before assembled with the fixing assembly. FIG. 7 is a sectional view of the second plate of the present disclosure, while being assembled with the fixing assembly. FIG. 8 is a sectional view of a second plate of the present disclosure, after assembled with the fixing assembly. FIG. 9 is an elevational view of assembly of the fixing assembly, the first plate and the second plate of the present disclosure. FIG. 10 is a sectional view taken along a line A of the FIG. 9. As can be seen from FIGS. 4-10, in order to fix the first plate 2 with the second plate 3, the second plate 3 is placed in parallel to the first plate 2, and two inner sidewalls of the channel 33 of the second plate 3 are aligned with the fixing assembly 1, and the second plate 3 is then inserted towards the fixing assembly 1. During insertion, the supporting surfaces 34 of the second plate 3 contact with the guiding incline 1441 of the stop part 144 first, and the second plate 3 is then pushed into the fixing assembly 1. By the supporting surface 34, the fastener 14 is pushed remote from the sleeve 11, so that the rod 142 and the stop section 143 of the fastener 14 are moved out of the hole 111 of the sleeve 11 and, at the same time, the position-limiting device 12 is driven to move, and the bottom of the position-limiting device 12 then presses an end of the elastic element 13 to resiliently deform the elastic element 13 until the guiding incline 1441 of the stop part 144 is abutted with the two opposite sidewalls of the channel 33 of the second plate 3. At this time, the rod 142 and the stop section 143 are also moved into the channel 33, and when the second plate 3 is further moved towards the fixing assembly 1, the rod 142 is moved between the two supporting protrusions 331, and the stop section 143 and the stop part 144 are located below the two supporting protrusions 331. Next, when the second plate 3 is further moved toward fixing assembly 1, the rod 142 passes through the two supporting protrusions 331 into the first fastening recess 311, and the stop section 143 is moved into the second fastening recess 321. The outer diameters of the rod 142 and the stop section 143 are smaller than that of the first fastening recess 311, and the outer diameter of the stop part 144 is ranged between that of the first fastening recess 311 and the second fastening recess 321, so the rod 142 and the stop section 143 are released from the abutted state after entering the first fastening recess 311 and the second fastening recess 321 respectively, and the elastic element 13 is recovered elastically, and simultaneously pushes the position-limiting device 12 back to its original position, and the fastener 14 is also moved towards the position-limiting device 12 and back to an original position thereof. As a result, the stop section 143 and the stop part 144 of the fastener 14 are respectively positioned in the first fastening recess 311 and the second fastening recess 321 stably, thereby completing an operation of reliably combining the second plate 3 with the fixing assembly 1.

In order to separate the second plate 3 from the first plate 2, a user just presses a surface of the plate 122 of the position-limiting device 12 to downwardly move the fastener 14, and the rod 142 of the fastener 14 is then moved out of the hole 111 of the sleeve 11, so that the stop section 143 and the stop part 144 of the fastener 14 are respectively free from being constrained by the first fastening recess 311 and the second fastening recess 321. At the same time, the bottom of the position-limiting device 12 presses and elastically deforms the elastic element 13, so that the second plate 3 is forced to move in a direction reverse to the insertion direction, the rod 142 and the stop section 143 are then passed through the channel 33 to the outside of the second plate 3. After the user stops applying force by finger, the elastic element 13 is elastically recovered and drives the position-limiting device 12 and the fastener 14 back to original positions thereof, and the rod 142 returns back to the hole 111 of the sleeve 11 again. As a result, the fixing assembly 1 can be used to assemble with the second plate 3 again.

The fixing assembly 1 has a simple structure and provides a guiding effect during detachment, and the assembly of the fixing assembly 1 and the second plate 3 can be performed by just aligned insertion without using hand tools or rotating screws by hand; furthermore, in order to separate the fixing assembly 1 from the second plate 3, the user just need to press the surface of the position-limiting device 12 by finger to separate the second plate 3. As a result, the fixing assembly 1 of the present disclosure can achieve effects of reliable positioning and easy detachment.

Furthermore, the two supporting surfaces 34 of the second plate 3 at two outer sides of the channel 33 are arc-shaped, each of the two supporting surfaces 34 has a larger area for pushing the guiding incline 1441 of the stop part 144, so that the rod 142 is moved out of the hole 111 of the sleeve 11 more easily. Besides, the arc-shaped supporting surfaces 34 can also enhance structural strength of the second plate 3 and improve lifetime of the second plate 3.

It should be noted that aforementioned embodiment is just taken as an example for illustration, but the scope of the present disclosure is not limited thereto. The fixing device of the present disclosure uses the guiding incline 1441 of the stop part 144 at the bottom of the fastener 14 of the fixing assembly 1 to slide the supporting surfaces 34 of the second plate 3, to drive the rod 142, the stop section 143 and the stop part 144 of the fastener 14 to pass through the channel 33, and after the elastic element 13 is elastically recovered, the stop section 143 and the stop part 144 are respectively positioned in the first fastening recess 311 and the second fastening recess 321 reliably. In order to separate the fixing assembly 1 from the second plate 3, the user just needs to push the surface of the position-limiting device 12. As a result, the fixing device of the present disclosure can achieve the effects of reliable positioning and easy detachment.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A fixing device comprising a fixing assembly, a first plate and a second plate, wherein:

the fixing assembly comprises a sleeve, a position-limiting device, an elastic element, and a fastener, the sleeve comprises a hole cut therethrough and a fastening part formed at a bottom thereof, the position-limiting device is disposed inside the sleeve and comprises an embedded hole cut through a central portion thereof, the elastic element is abutted between a bottom of the position-limiting device and the sleeve, the fastener is inserted into the hole of the sleeve from bottom of the sleeve and fixed on the position-limiting device, and wherein the fastener comprises a butt joint part configured to embed into the embedded hole, a rod extended from a bottom of the butt joint part and configured to insert through the hole of the sleeve, and a stop section extended outwardly from a bottom of the rod, out of the sleeve and having an outer diameter higher than a diameter of the hole, and the stop section comprises a stop part outwardly protruded at a bottom thereof and having an outer diameter gradually-extended, and the stop part comprises a guiding incline formed at a top thereof;

wherein the first plate comprises a hole configured to fix the fastening part of the sleeve;

wherein the second plate is placed in parallel to the first plate for assembly, the second plate comprises a base plate, a first fastening recess cut through the base plate and configured for insertion of the stop section, and a sheet folded and extended from a side of the base plate, and the sheet comprises a second fastening recess cut therethrough, located below and aligned with the first fastening recess, having an outer diameter larger than that of the first fastening recess, and configured for insertion of the stop part, and wherein a folded portion of the second plate comprises a channel cut therethrough from outside to inside and in communication with the first fastening recess and the second fastening recess, and the channel comprises supporting protrusions at an end portion thereof and respectively protruded from two inside walls of a side of the base plate, and the folded portion of a side of the second plate comprises supporting surfaces respectively formed at two outer sides of the channel, and configured to abut against the guiding incline of the stop part, to drive the rod to move out of the hole of the sleeve.

2. The fixing device according to claim 1, wherein the hole comprises a receiving groove formed at a top thereof and having an extended diameter, and the receiving groove is configured to abut with an end of the elastic element.

3. The fixing device according to claim 1, wherein the fastening part of the sleeve comprises an annular trench on an outer surface thereof.

4. The fixing device according to claim 1, wherein the position-limiting device comprises a groove recessed on a surface thereof and along a periphery of the embedded hole, and the fixing assembly further comprises a plate configured to cover the groove.

5. The fixing device according to claim 1, wherein a contained angle between the guiding incline of the stop part and a bottom surface of the stop part is in a range of 60° to 120°.

6. The fixing device according to claim 1, wherein the outer diameters of the rod and the stop section are smaller than that of the first fastening recess, and an outer diameter of the stop part is larger than that of the first fastening recess and smaller than that of the second fastening recess.

7. The fixing device according to claim 1, wherein a height difference is formed between the sheet and the base plate of the second plate for passing the stop section.

8. The fixing device according to claim 1, wherein an interval of the channel of the second plate is larger than the outer diameter of the stop section, and smaller than the outer diameter of the stop part, and a distance between the two supporting protrusions of the channel is larger than the outer diameter of the rod and smaller than the outer diameter of the stop section.

9. A fixing device comprising a fixing assembly which comprises a sleeve, a position-limiting device, an elastic element and a fastener, wherein:

the sleeve comprises a hole cut therethrough and a fastening part formed at a bottom thereof, and the position-limiting device is disposed inside the sleeve and comprises an embedded hole cut through a central portion thereof, and the elastic element is abutted between a bottom of the position-limiting device and the sleeve, and wherein the fastener is inserted into the hole of the sleeve from bottom of the sleeve to fix on the position-limiting device, and the fastener comprises a butt joint part configured to embed into the embedded hole, a rod extended from a bottom of the butt joint part and configured to insert through the hole of the sleeve, a stop section extended outwardly from a bottom of the rod, out of the sleeve and having an outer diameter larger than a diameter of the hole, and the stop section comprises a stop part outwardly protruded at a bottom thereof and having an outer diameter gradually-extended, and the stop part comprises a guiding incline formed at a top thereof, and a supporting surface of a plate abuts against the guiding incline to drive the rod to move out of the hole of the sleeve.

10. The fixing device according to claim 9, wherein the position-limiting device comprises a groove recessed on a surface thereof and along a periphery of the embedded hole, and a plate is covered on the groove.

* * * * *